Feb. 13, 1962  G. APITZ  3,020,808
METHOD FOR CONTINUOUSLY GENERATING BEVEL GEARS
WITH STRAIGHT TEETH
Filed Sept. 23, 1958  19 Sheets-Sheet 1

INVENTOR
Gerhard Apitz
BY
Harness, Dickey & Pierce.
ATTORNEYS.

INVENTOR
Gerhard Apitz.
BY
Harness, Dickey & Pierce.
ATTORNEYS.

Feb. 13, 1962  G. APITZ  3,020,808
METHOD FOR CONTINUOUSLY GENERATING BEVEL GEARS
WITH STRAIGHT TEETH
Filed Sept. 23, 1958  19 Sheets-Sheet 8

INVENTOR
Gerhard Apitz
BY
Harness, Dickey & Pierce,
ATTORNEYS.

Continuous roll-milling machine for bevel gears with straight teeth.

United States Patent Office 3,020,808
Patented Feb. 13, 1962

3,020,808
METHOD FOR CONTINUOUSLY GENERATING BEVEL GEARS WITH STRAIGHT TEETH
Gerhard Apitz, Hamburg, Germany, assignor to Heidenreich & Harbeck, Hamburg, Germany, a German partnership
Filed Sept. 23, 1958, Ser. No. 762,888
Claims priority, application Germany Oct. 1, 1957
16 Claims. (Cl. 90—5)

The invention relates to a method for continuously generating bevel gears with straight teeth.

Bevel gears with straight teeth are today extensively used in engineering. Because the time spent in generating the teeth amounts to a substantial part of the total time spent in making the wheel, attempts have been made in recent years to reduce the time spent in tooth generation by new operating methods.

The object of the invention is to provide a method which guarantees the shortest possible working time and precise manufacture of the teeth.

KNOWN METHODS

Bevel gears with straight teeth are today manufactured generally in rolling processes using planing or milling, in copying methods by planing or in broaching methods.

The planing in the copying methods necessitates the highest working time for the tooth formation and comes into consideration only for the largest wheels (over 750 mm. diameter) with large modulus.

In the planing in the rolling indexing method, two rams or sliding heads of the roller members, which support the planing tool, are so arranged that on the forward and backward movement of the rams, the planing tool works toward the apex of the cone, whereby the tooth is formed. The wheel is secured on the indexing head. The forward and backward movement of the planer tool acts on the whole material of the wheel blank and cuts out a gap between the teeth. After the total tooth depth is reached, an additional rotating movement is imparted to the entire roller member and the indexing head besides the forward and backward movement of the planer tool, so that the tooth profile can be rolled or generated. After the tooth profile has been rolled the whole roll body is withdrawn so that the planer tool comes free from the wheel blank. Now the roller member turns back to its original position and the indexing head travels likewise through a return movement and at the same time through an indexing movement whereby the next tooth gap can be cut. Thus in the manufacture of a bevel gear it must be rolled and indexed as often as the wheel possesses teeth. This repeated rolling and indexing naturally means a considerable expenditure of time.

The process for roller milling is similar to the roller planing process except that the planing tool is replaced by a milling tool. The cutter does not undergo a forward and backward movement but only a rotational movement about its axis. In this way the tooth base is not straight as in planing but concave. It must always be cut lower so that the necessary active profile reaches over the whole breadth of the tooth. The cutter next cuts out also a tooth space which is then rolled. After the rolling the milling cutter is withdrawn from the wheel blank and there follows now a back rotation into the original position and the indexing after which the next tooth space can be worked on.

The cutting goes indeed more quickly than the planing, it however likewise requires rolling and indexing as often as the wheel has teeth. This kind of cutting is also known as rolling cutting.

In the broaching process, a rounded broach is used which works in a way similar to the cutter. The broach knives are arranged on a round base similar to the milling cutter teeth. The pre-cutting knives are different in their height, so that they first part the teeth spaces. The then following finishing knives finally cut the profile on both sides of a space. Here no rolling takes place. Because the tooth profile varies along the breadth of the tooth each finishing cutter makes only a wholly determined cut. Each successive finishing cutter possesses a different profile. So that each finishing cutter can cut a profile appropriate to itself in the wheel blank the broaching tool must move along the breadth of the tooth in broaching. The broach teeth are difficult to manufacture because the cutting sides of these cutters must correspond precisely to the profile to be cut which as mentioned varies from cutter to cutter. The broaching tools are thus high in price.

The broaching is very quick. On each reciprocation of the broaching tool a tooth space is finished. There is in this case no rolling but only indexing. There is therefore indexing as often as the wheel has teeth.

The cutting edges of the planer tool and the milling cutters are linear. With these linear cutting edges, the tooth profile is rolled from tooth to tooth in the indexing process. The cutting edges of the broaches have a profiled form. The tooth spaces are cut out in the indexing process without rolling.

TECHNICAL PROBLEM

As appears from the state of the art all accurate bevel gears are today manufactured in roller indexing processes or broaching processes. Because the rolling and indexing from tooth to tooth is time consuming, a continuous process from which the individual rolling and indexing steps are omitted can bring considerable advantages in respect of working time.

The technical problems then consist in finding a continuously working process for bevel gears with linear teeth from which the separate rolling and indexing steps are omitted.

The attached drawings will help to interpret the invention more clearly, said drawings explaining the process of the invention.

SOLUTION OF THE TECHNICAL PROBLEM

(1) Producing the flank lines

(A) EXPLAINING THE METHOD

Figure 1:
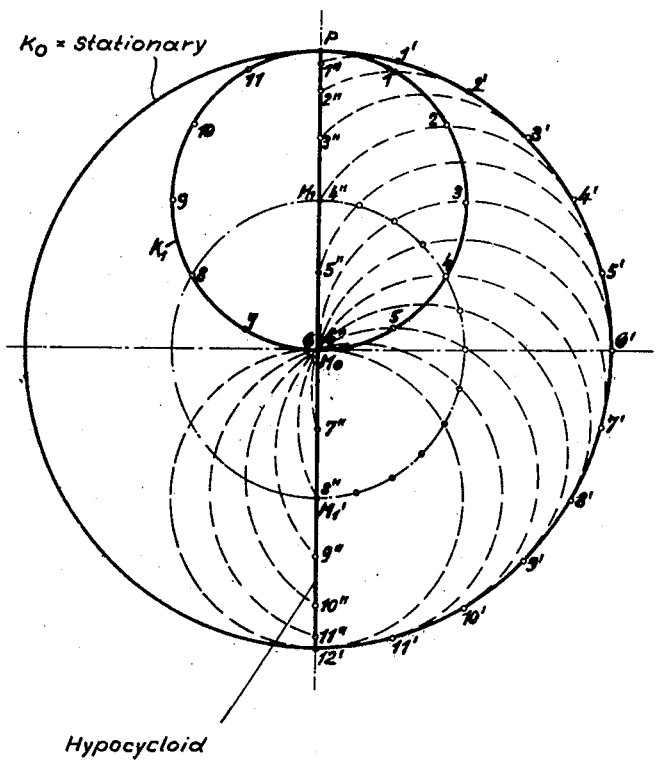
FIG. 1 shows the generation of a straight-lined hypocycloid when a circle $K_1$ goes through a stationary circle $K_0$, the diameters of the circles being at a ratio of 1:2.
Figure 2:
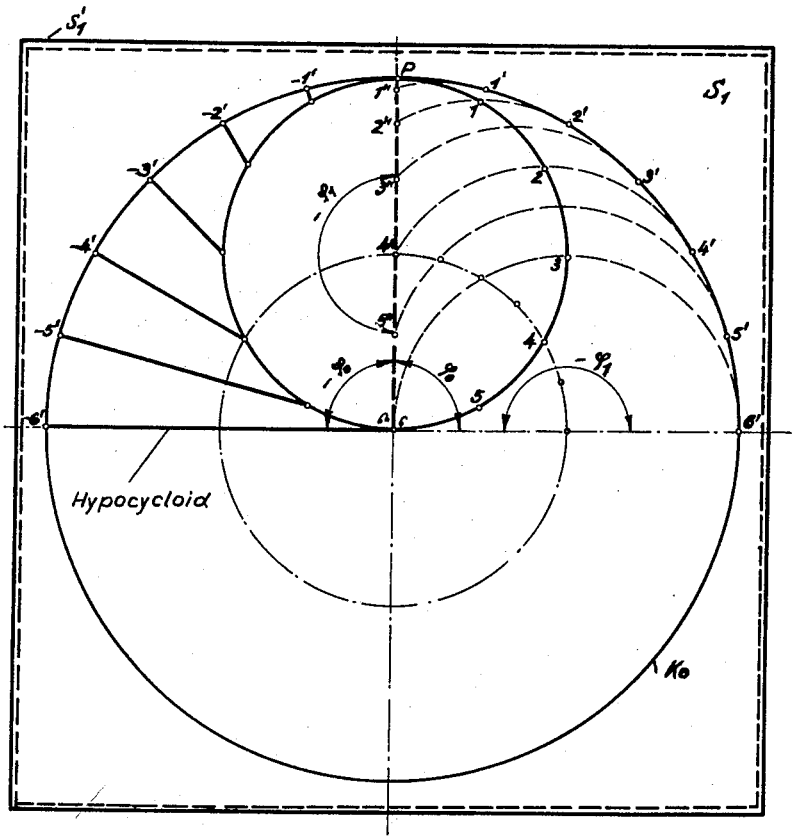
FIG. 2 shows the generation of a straight-lined hypocycloid when the circle $K_1$ is rotating about its middle point $M_1$ and the circle $K_0$ is rotating about its middle point $M_0$, with both the circles rotating at the same speed.

If in a fixed circle $K_0$ (FIG. 1) a circle $K_1$ of which the diameter equals the radius of the circle $K_0$ is so rolled that the points $1, 2, 3$ etc. of the circle $K_1$ come to lie on a series of points $1', 2', 3'$ etc. of the circle $K_0$, then a hypocycloid track $1'', 2'', 3''$ and etc. runs through a point P lying on the circle $K_1$. This cycloid path is a straight line and equals the diameter of the fixed circle $K_0$. In this way the middle point $M_1$ of the circle $K_1$, which follows a path turning about the middle point $M_0$ at a distance $\overline{M_1M_0}$, moves on a circular path of radius $\overline{M_1M_0}$ to $M_1'$. One can also consider the process in this following way: If in FIGURE 2 the circle $K_1$ of which the diameter $d_1$ equals the radius $r_0$ of the circle $K_0$ rolls in the first fixed circle $K_0$ so that the points $1, 2, 3$ etc. of the circle $K_1$ come to lie on the points $1', 2', 3'$ etc. of the circle $K_0$ then the point P of the circle $K_1$ goes through the hypocycloid $P, 1'', 2''$ to $6''$. The circle $K_0$ remains still, the line $\overline{M_1M_0}$ has a turning motion about the middle point $M_0$ through the angle $\varphi_0$ and the circle $K_1$ has a left-hand rotation through the angle $\varphi_1$ about its middle point $M_1$. If one thinks of a paper arc system $S_1$ lying under the circle $K_0$ and connected to the circle $K_0$, then this system $S_1$ also has no movement.

If now this whole picture is blocked out, so that the individual members cannot turn one under the other, and turned as a whole about the middle point $M_0$ back to the left through the angle $\varphi_0$, then the path $\overline{M_1M_0}$ of the circle $K_0$ and the system $S_1$ go through a rotation to the left through the angle $-\varphi_0$ about the middle point $M_0$. The individual and total movements produced are as follows:

| Member | 1st movement | +2nd movement | =Resultant movement |
|---|---|---|---|
| Path | $M_1M_0 = +\varphi_0 +$ | $(-\varphi_0)$ | $= 0$ |
| Circle | $K_1 = -\varphi_1 +$ | $0$ | $= -\varphi_1$ |
| Circle | $K_0 = 0 +$ | $(-\varphi_0)$ | $= -\varphi_0$ |
| System | $S_1 = 0 +$ | $(-\varphi_0)$ | $= -\varphi_0$ |

Figure 3:
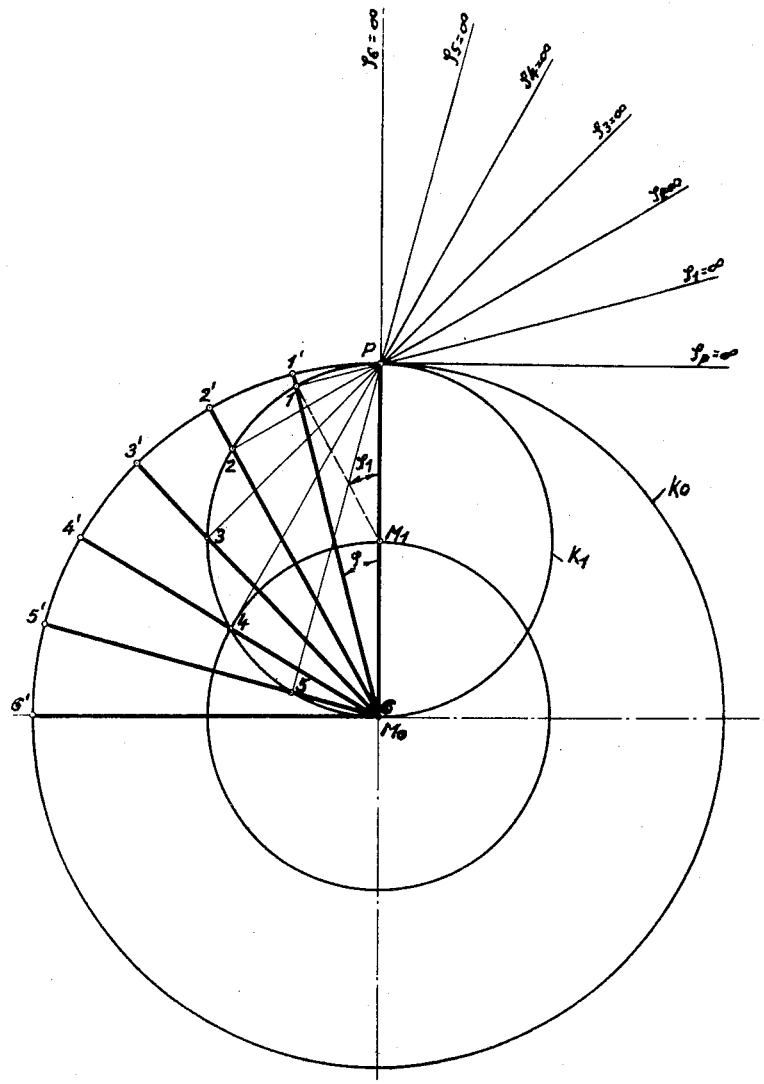
FIG. 3 is a schematic view showing that the lines extending vertically of the hypocycloid which are erected at the respective points of intersection are always intersecting in the point P.

If the circle $K_1$ is turned to the left about its fixed middle point $K_1$ through the angle $-\varphi_1$ and the circle $K_0$ with the paper arc system $S_1$ is turned to the left about its fixed middle point $M_0$ through the angle $-\varphi_0$, then a pencil fixed at point P on the circle $K_1$ draws on the system $S_1$ the hypocycloid $-6'M_0$. The path $\overline{M_1M_0}$ has thus performed no rotation about the middle point $M_0$. The process is again described with reference to FIGURE 3. If the circle $K_1$ turns about its middle point $M_1$ through the angle $-\varphi_1$ to the left and circle $K_0$ about its middle point $M_0$ through the angle $-\varphi_0$ to the left, then a pencil fixed at the point P on the circle $K_1$ describes on the system $S_1$ the hypocycloid $\overline{1'1}$. On each further rotation of the circle $K_1$ through the angle $\varphi_1$ and of the circle $K_0$ through the angle $\varphi_0$, a further piece of the cycloid is described. If the circle $K_1$ turns six times through the angle $\varphi_1$, thus through $180°$, and the circle $K_0$ six times through the angle $\varphi_0$, thus through a total of $90°$, then the cycloid $6'M_0$ is generated, which appears as a straight line. At the individual points the circle $K_1$ and the straight line cut at the points 1 to 6.

If one now erects at each of these points the perpendicular to this line, then a bundle of straight lines is obtained. All the rays of this bundle meet at the point P which can be seen as the common pole of this bundle. The centre of curvature of the straight cycloid designated by points 1 to 6 lies on the associated ray at infinity.

Figure 4:
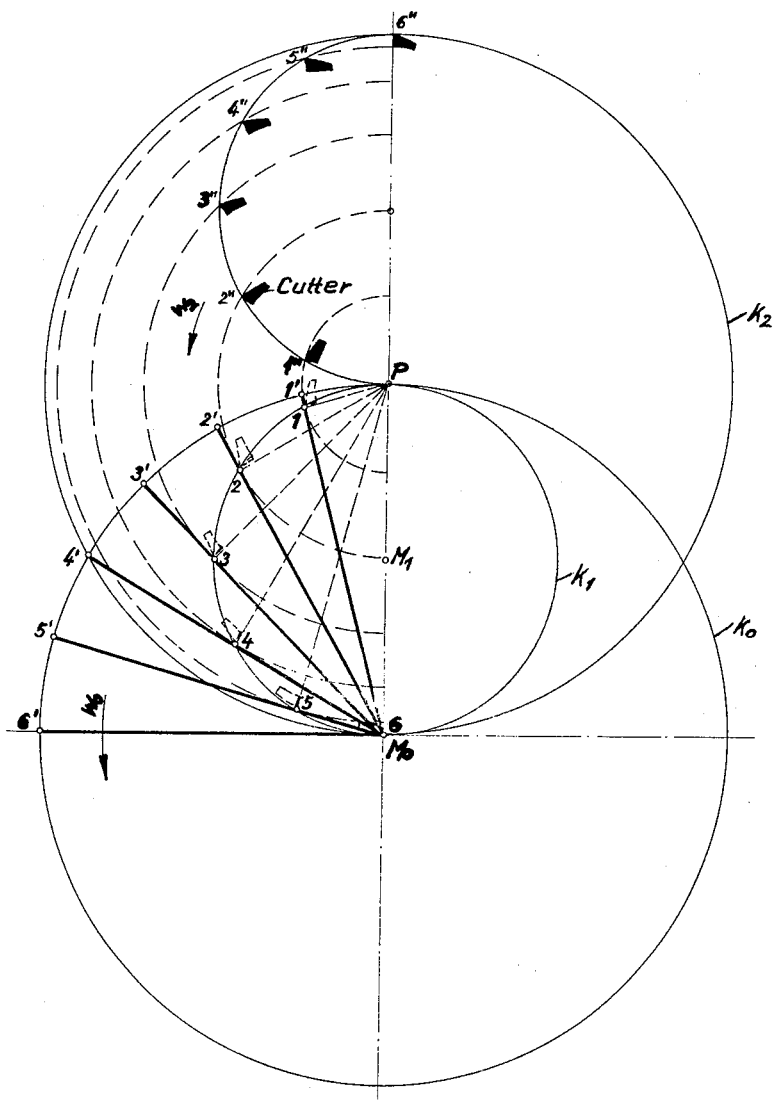
FIG. 4 is a schematic view showing that the individual points of the straight-line may also be generated by several cutters disposed in displaced arrangement, so that there is no necessity to keep to the ratio of the diameters of 1:2.

If the point P is considered the pole of the bundle of rays then a circle $K_2$ can be described about this pole and on the circular surface of $K_2$ at the points $1'', 2'', 3''$, etc. machine tools can be secured as is shown in FIGURE 4.

If now the circular surface of $K_2$ with the tools secured thereto is turned about the pole P with an angular velocity $W_2$ to the left and the circle $K_0$ is turned about its middle point $M_0$ with the co-ordinated angular velocity $W_0$ likewise to the left, then the tools secured on the circular surface of $K_2$ describe circles centred on the pole P indicated in broken lines which touch the linear cycloid at the points $1, 2, 3$ and etc. The tools thus cut the line at these points, as is indicated by the tools indicated in the broken lines.

Figure 5:
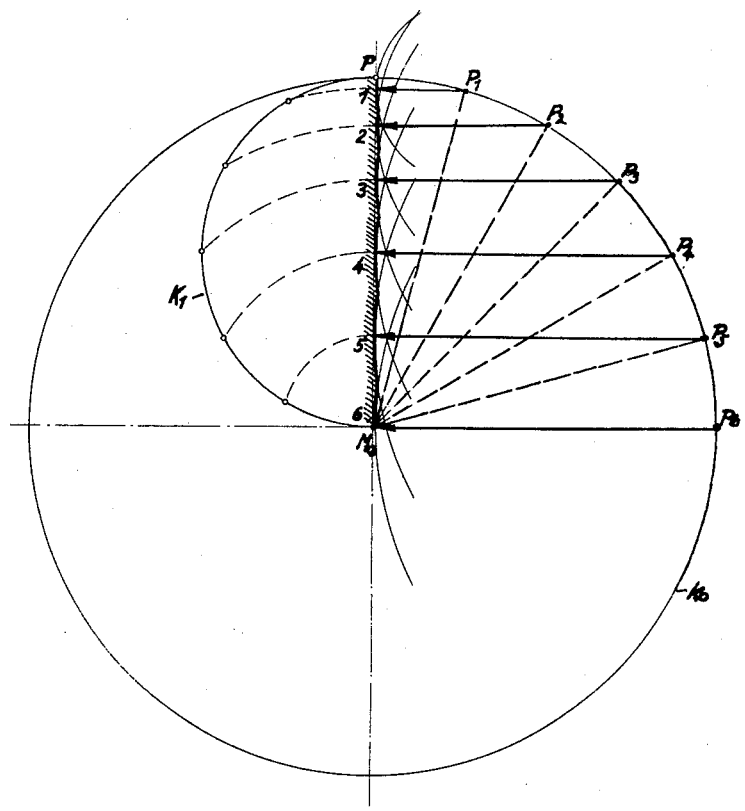
FIG. 5 is a schematic view of the flank line cut in accordance with FIG. 4.

If now all the cuts made by the tools are considered together, then FIGURE 5 is obtained, i.e. the total line of cut effected is an assembly of the individual segments and the linear cycloid is the envelope of all the segments.

Figure 6:
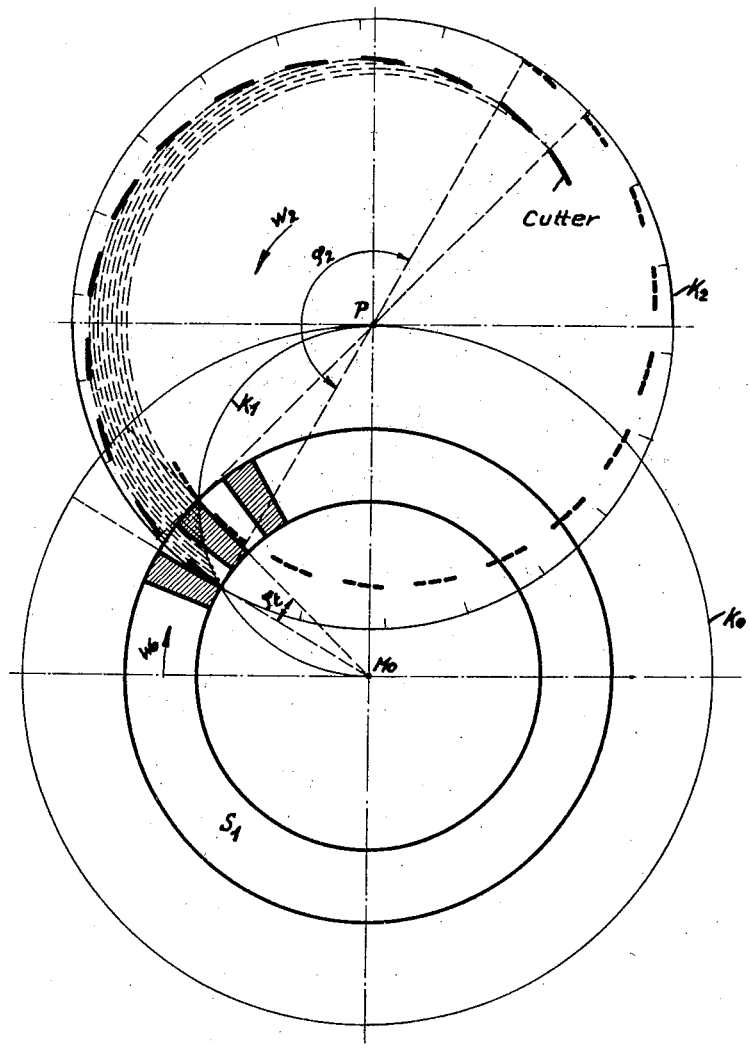
FIG. 6 shows the principle of the cutting process.

In practice however for forming the flank lines of a bevel gear with linear teeth not all the linear cycloids of P to 6 (FIGURE 5) are necessary but only a part of these cycloids is necessary, as is shown in FIGURE 6. Correspondingly there need to be machined only these selected parts of the flank lines of the tools. In this way a plurality of cutters can be arranged on the circular surface of $K_2$ and the cut segment pieces can return towards one another so that the said section lines nearly correspond in practice to the straight line. A like process takes place also in the roller milling of knitting wheels with a roller mill.

If the wheel system $S_1$, FIG. 6, turns towards the right through the angle $\varphi_t$ about its middle point $M_0$, then the tools have performed in the same time about their middle point P a left-hand rotation through the angle $\varphi_2$. The wheel system $S_1$ thus has an indexing movement so that the second knife series indicated in broken lines can work on the next tooth gap.

The plurality of cutters follow the cutting arc (FIGURE 7) closely one after another, and it is a matter of choice to space the cutters so that a clean cut flank surface is obtained.

Figure 7:
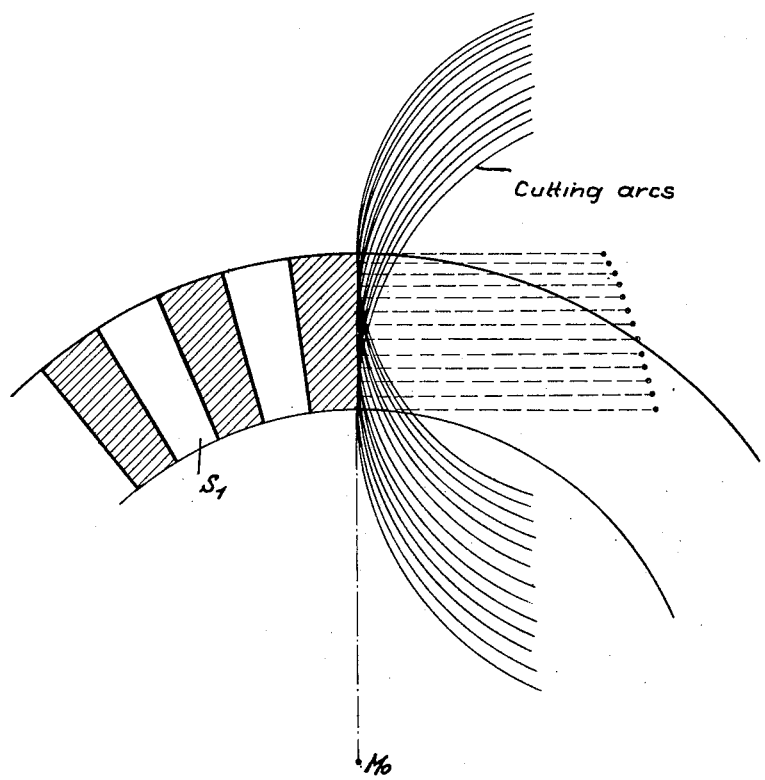
FIG. 7 shows the position of the cutting arcs.

In FIGURES 5 and 7 the arc of the cut is designated as a semi-circular arc for simplicity. The cutters, which are secured to the circular surface of $K_2$, run through circles on the rotation of this circular surface about its pole P, which are centred on the pole P. In system $S_1$ these knives however cut cycloids according to FIGURE 8 or FIGURE 9 according to the turning direction of the system $S_1$ and the tools $K_2$ because the system $S_1$ is turned likewise.

Figure 8:
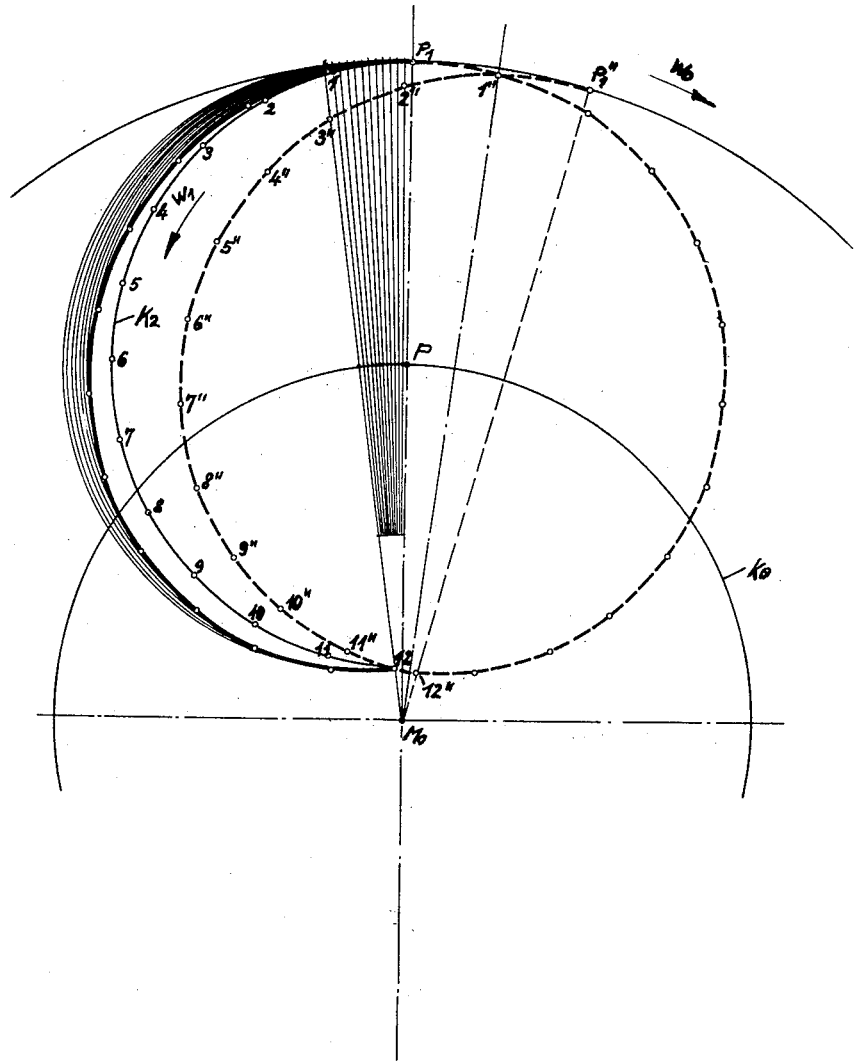
FIG. 8 shows the configuration of the cutting arcs generated.
Figure 9:
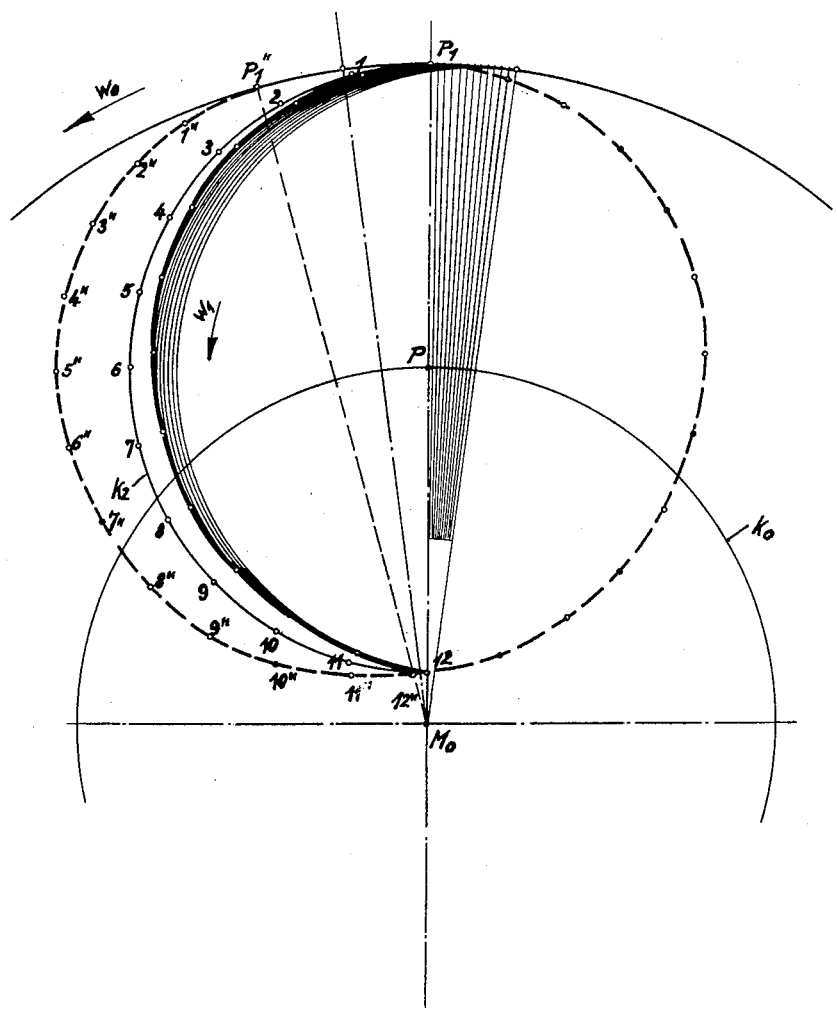
FIG. 9 shows the configuration of the cutting arcs generated.

The cut flank lines is thus not an assembly of circular arcs, as represented in FIGURES 5 and 7 on the grounds of simplicity, but an assembly of cycloid arcs as shown in FIGURES 8 or 9, according to the turning direction.

Previously the formation of the flank line of a toothed flank (the left or the right) has been shown. However should the two flanks, the left and the right, be cut at the same time then two cutter heads, as shown for example in FIGURE 10 are necessary.

Figure 10:
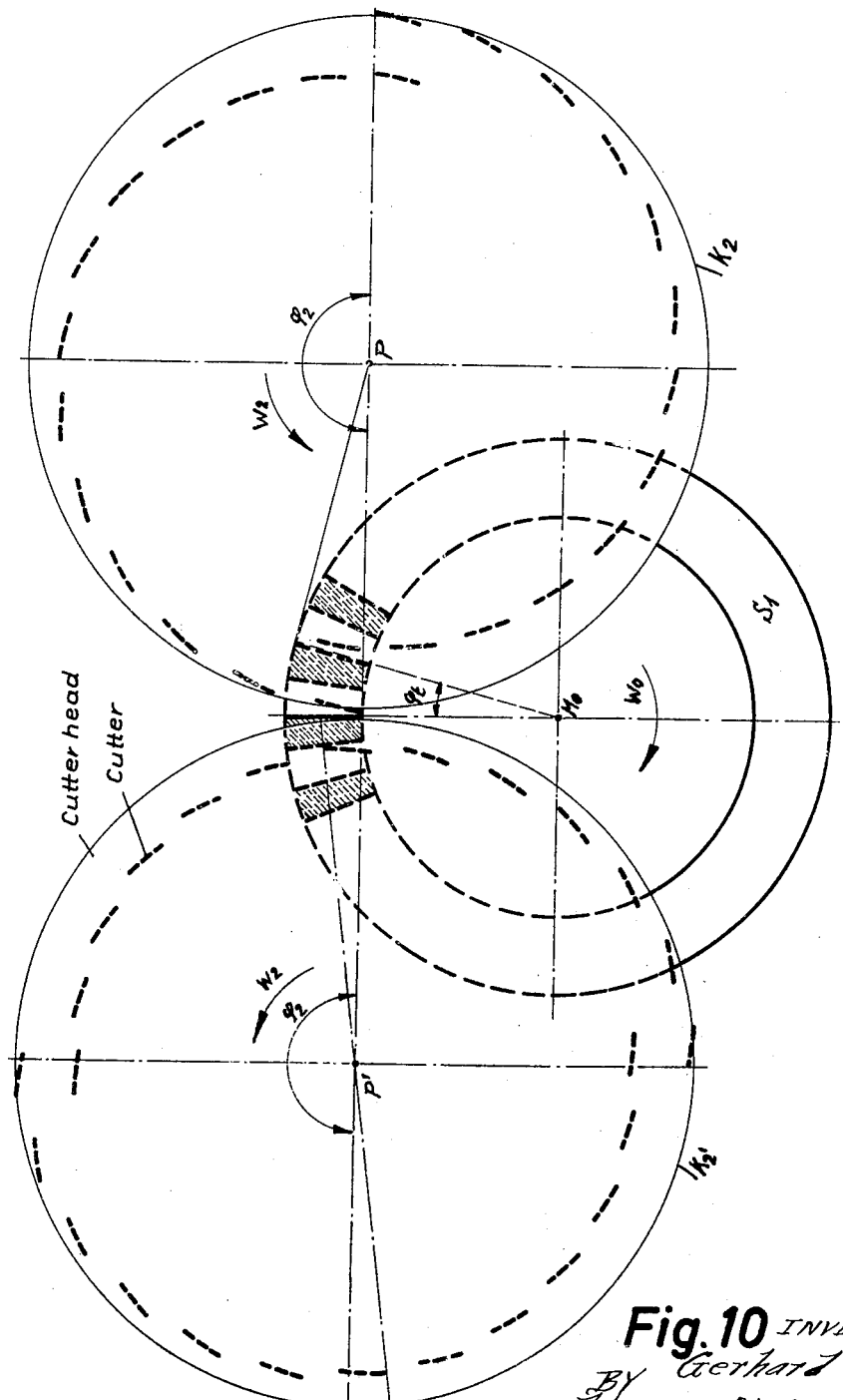
FIG. 10 is a schematic view of the position of the cutters with the same direction of rotation of cutter heads having two cutter series.

Because the turning direction of the cutter heads $K_2$ and $K_2'$ in FIGURE 10 is the same (to the left) and the turning direction of the system $S_1$ is contrary, the flank lines of the left and right flanks of the teeth of the system $S_1$ are formed of the cycloid arcs according to the cycloids of FIGURE 8. If however the turning direction of the cutter head $K_2'$ is reversed as in FIGURE 11 so that this rotates towards the right about its centre point $P'$ like the system $S_1$ about $M_0$, then the flank lines of the left-hand flank, which are cut by the cutters of the cutter head $K_2$, are formed by the arcs of the cycloids according to FIGURE 8 and the flank lines of the right flank, which are cut by the cutters of the cutter head $K_2'$, are formed by the arcs of the cycloids according to FIGURE 9.

In practice this has no effect on the construction of the flanks, because the cut can be made by a number of cutters lying sufficiently close to one another and the curvature of the two cycloids is not essentially different.

Figure 11:
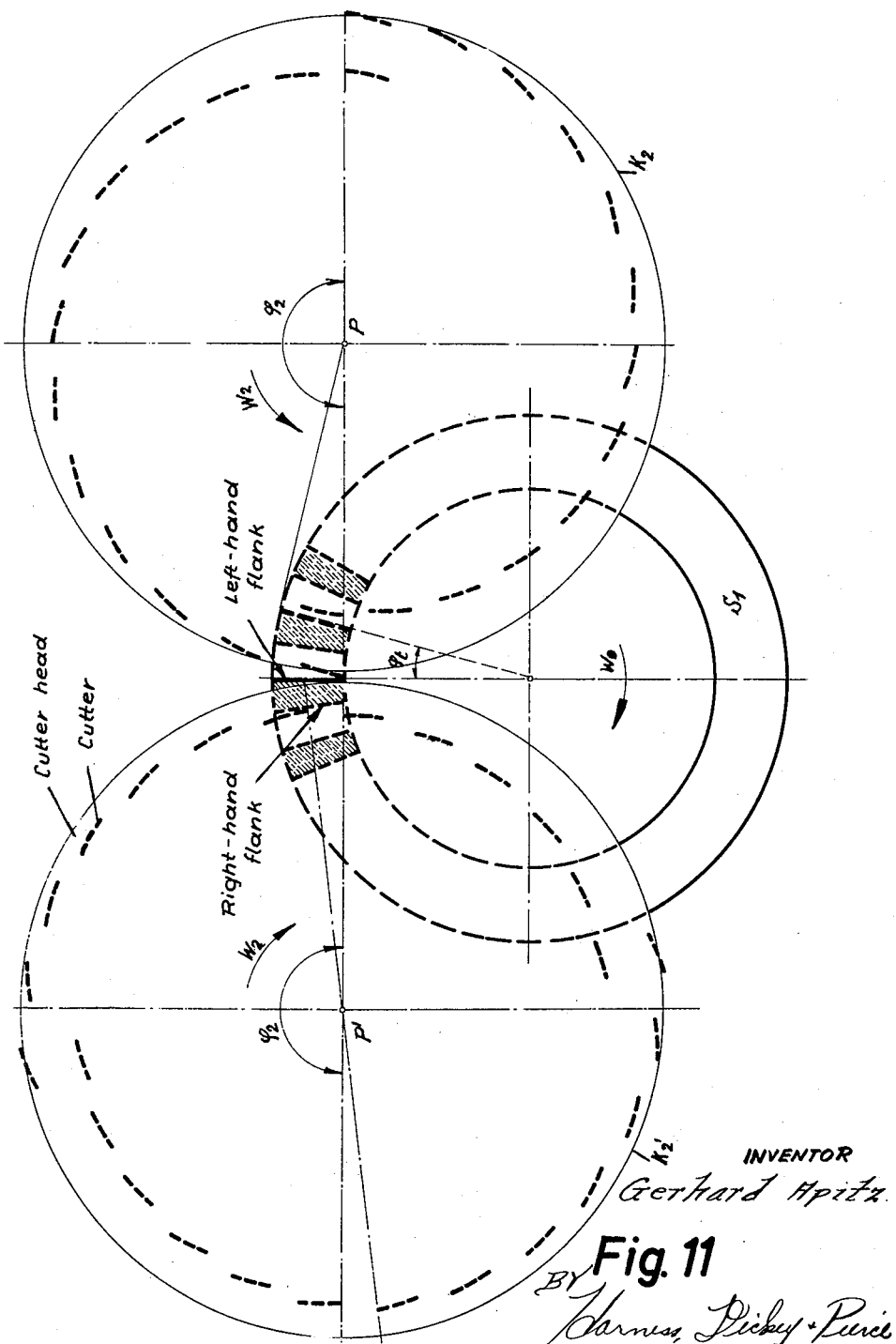
FIG. 11 is a schematic view of the position of the cutters with opposed direction of the cutter heads having two cutter series.
Figure 12:
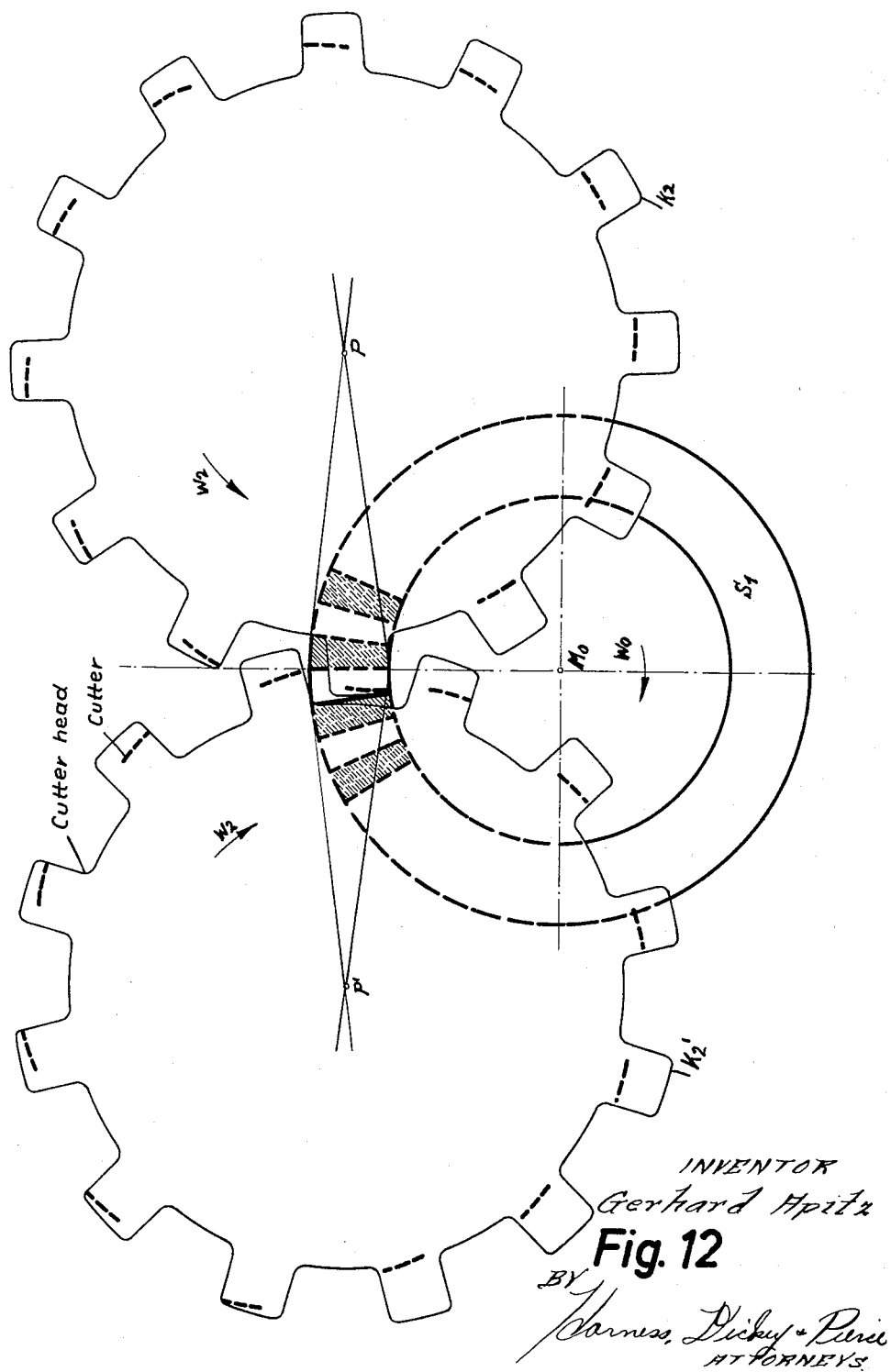
FIG. 12 is a schematic view of the position of the cutters with opposed direction of rotation and with cutter heads having one series of cutters.

Previously in FIGURES 10 and 11 two tooth spaces were cut. One can however machine the left and right flanks of a single tooth space at the same time, as shown in FIGURE 12. The cutters turn then, as in FIGURE 11, in opposed senses and the flank lines are produced as arcs of different cycloids.

(B) DIVERGENCE OF THE FLANK LINES FROM THE LINEAR (CROWNED CONSTRUCTION)

So that manufacturing and constructional mistakes and the hardening process in running the wheel cannot be fully effective, the flank lines are generally made crowned, i.e. they are not precisely linear but depart from this by a desired amount.

These crowned flank lines also can be manufactured by this method.

Figure 13:
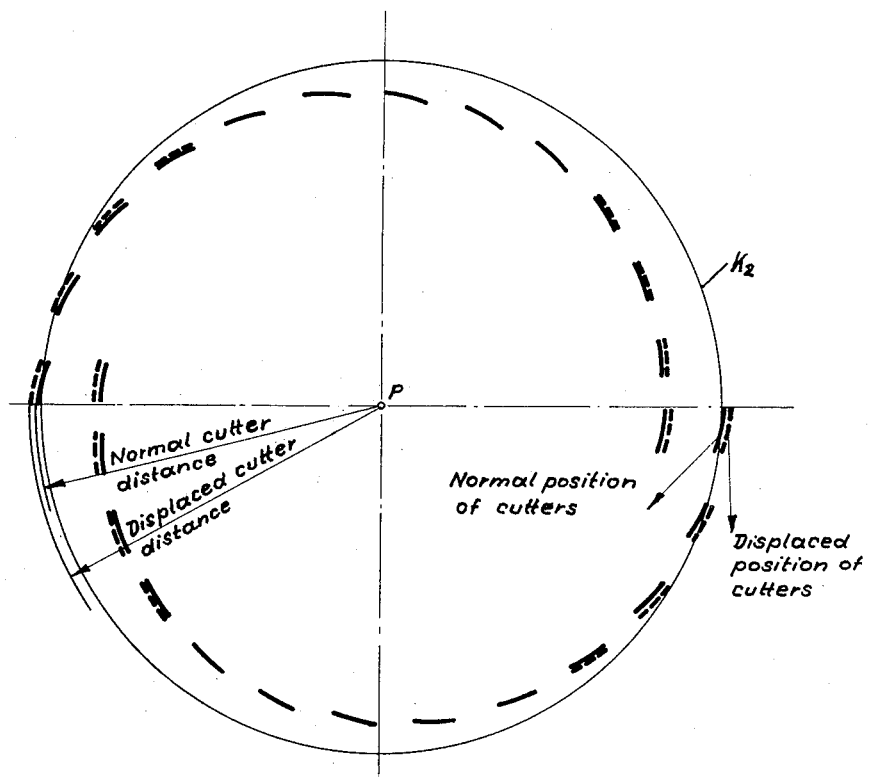
FIG. 13 is a schematic view of cutters in displaced arrangement for milling crowned flank lines.

It is necessary, as FIGURE 13 shows, only that a few of the first and last cutters of a cutter series are displaced outwards. In FIGURE 13 the fully drawn cutters are in the normal position and the cutters shown in broken lines are in the displaced position which will then give crowned flank lines. The middle cutters remain in their normal positions.

Figure 14:
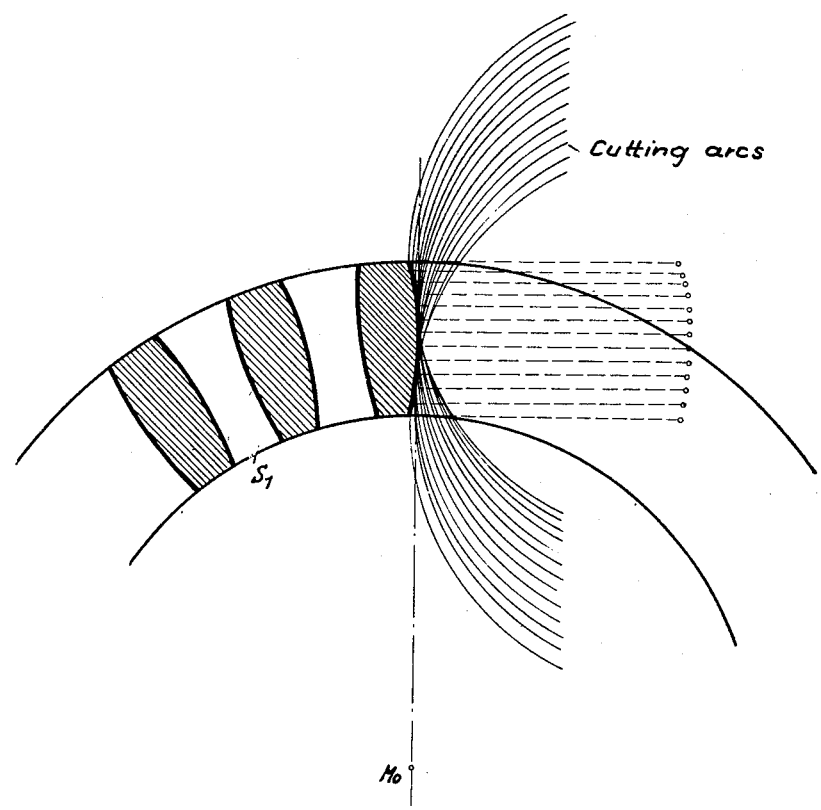
FIG. 14 shows a schematic representation of crowned teeth.

There is then produced a crowned flank as shown in FIGURE 14. The degree of crowning can be determined and the cutter position necessary thereto can be calculated very simply.

(C) CONSTRUCTION OF THE TEETH AND POSITIONING OF THE CUTTER HEAD

Figure 15:
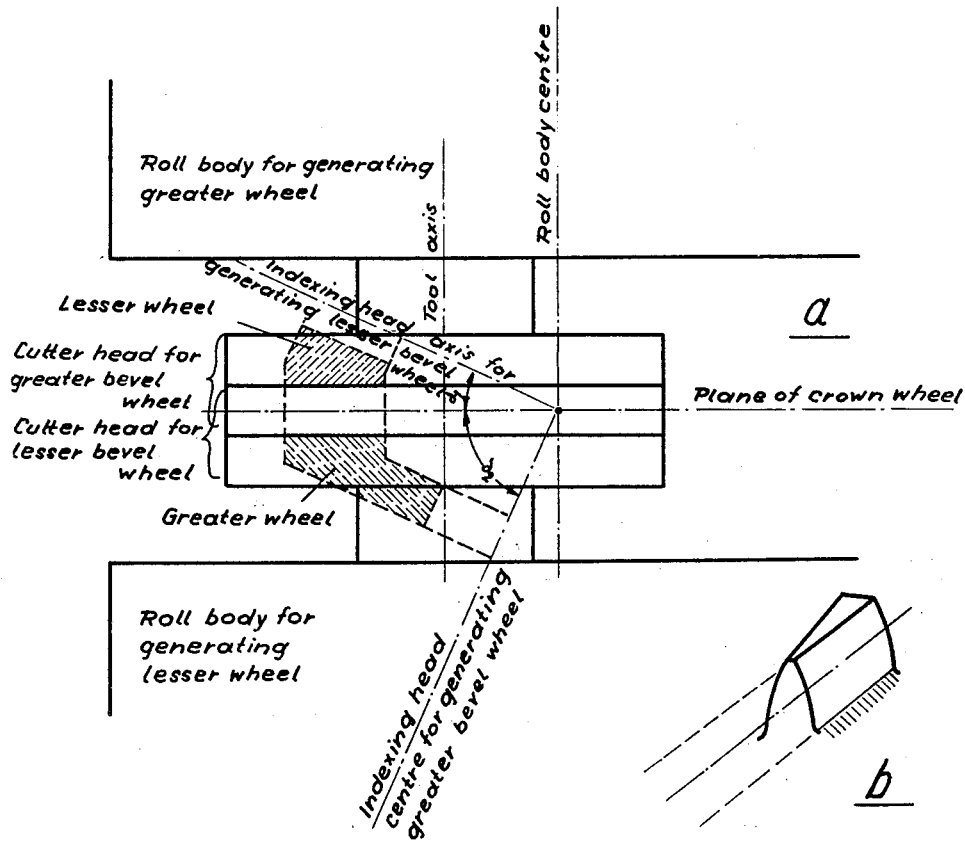
FIG. 15 shows an arrangement of the cutter heads with parallel tooth pitch.

The teeth can be made according to FIGURE 15 with parallel tooth level. The cutter head lies parallel to the crown wheel plane and produces in the bevelled part the accepted engagement angle, for example 20°. Because the teeth at the inner diameter fall out suitably angled or over angled, stump teeth, thus teeth with reduced tooth height, must be formed.

Figure 16:
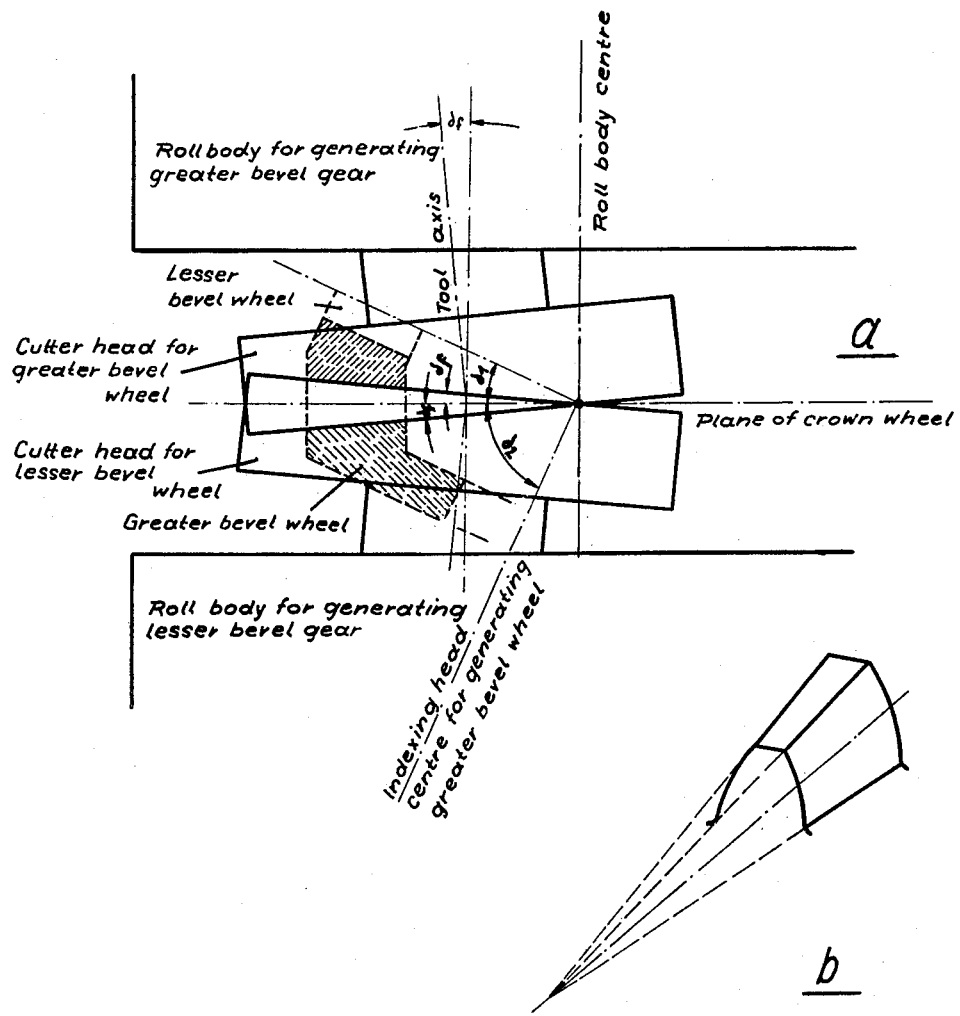
FIG. 16 shows an arrangement of the cutter heads with the tooth pitch extending conically.

Generally the teeth are provided with conically extending teeth according to FIGURE 16. These teeth can be provided with normal teeth height and give a good appearance as such. The cutter head then lies inclined to the crown wheel plane at the dedendum angle $\delta f$ and a suitable engagement angle, for example 20°, is here produced in the base cone. In the pitch cone other engagement angles are put in, are equally great in the wheel and the counter wheel, if the dedendum angles of the wheels are equally great. If these are not equally great in the wheel and the counter wheel as is the case in corrected wheels, then a reduction is made in the engagement angles which is however so slight that it can be in practice ignored. By pivoting the cutter heads and the dedendum angle $\delta f$ to the plane of the crown wheel, tooth flanks are generated having a slight crowning effect in the direction of the tooth height also as is desired.

(D) CROWN WHEEL, CROWN WHEEL TEETH NUMBER AND CONSTRUCTION OF THE CUTTER

Each bevel gear toothing is referred to a crown wheel, i.e. in this crown wheel must cover the lines of the flanks and the divisions of wheel and counter wheel. The crown wheel tooth number $Z_p$ is determined as follows:

$$Z_p = \frac{Z_1}{\sin \delta 1} = \frac{Z_2}{\sin \delta 2}$$

wherein $Z_1$=tooth number of the smaller wheel
$Z_2$=tooth number of the larger wheel
$\delta 1$=the pitch cone angle of the smaller wheel
$\delta 2$=the pitch cone angle of the larger wheel The values $$\frac{Z_1}{\sin \delta} \text{ and } \frac{Z_2}{\sin \delta}$$

have only in the very simplest case a whole number value. In most cases fractional numbers are obtained, i.e. in most cases the crown wheel number is a decimal number. These crown wheel tooth numbers have no influence here on the construction of the machine tools, if, as for example appears from FIGURE 6, the cutter series is laid out on the circular surface of $K_2$ at spaced parts. If the wheel blank $S_1$ turns through the angle $\varphi t$ about its middle point $M_0$ then it has moved through one further division. During this time according to FIGURE 6 however the cutter head has performed a rotation through 180° and the cutter series has thus cut the flank line of one tooth. Now however the second cutter series shown in dotted lines begins to cut another flank line of another tooth which lies one space distant from the first.

The machine tool is thus not connected to the crown wheel tooth number but depends solely on the pitch.

One can therefore cut with a tool fixed for a certain pitch a plurality of wheels with different tooth numbers. In each fixed cutter series the first 1, 2, 3, knives can also be formed as pre-cutters.

(2) *Rolling the tooth profiles*

Figure 17:
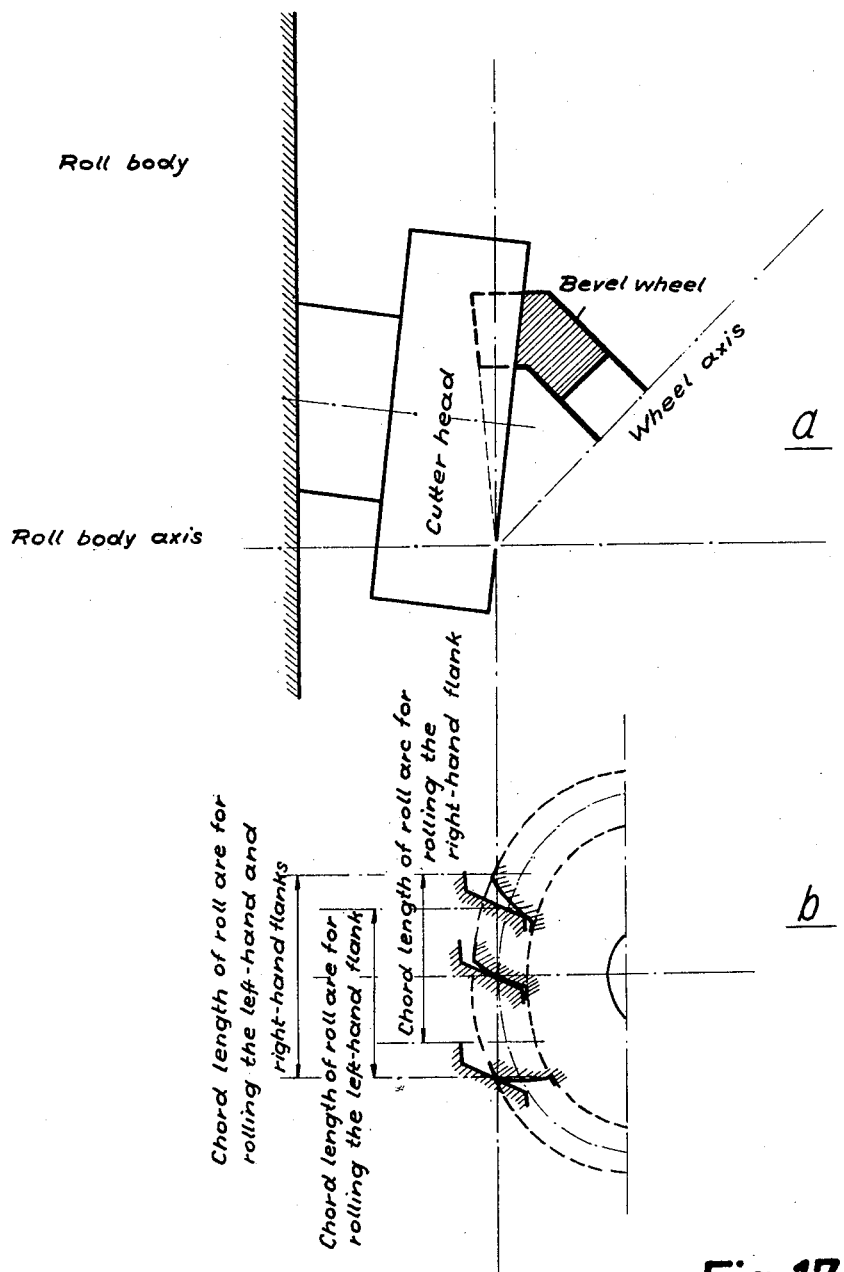
FIG. 17a is a schematic representation of the wheel and the tool head.
FIG. 17b shows a schematic representation for rolling the tooth profiles.

In section (1) the production of flank lines along the tooth breadth only was dealt with. This however does not produce the tooth profile (octoid). To generate the tooth profile, the roll body with the cutter head secured thereto must perform additionally a roller movement about the roller body axis (FIGURE 17). In FIGURE 17a the wheel is shown in section and the position of the cutter heads and the roller bodies is indicated. FIGURE 17b shows the roller method for rolling the left flank of a tooth. The same rolling process is necessary in a displaced position for the right-hand flank. Both use the total rolling process.

Figure 18:
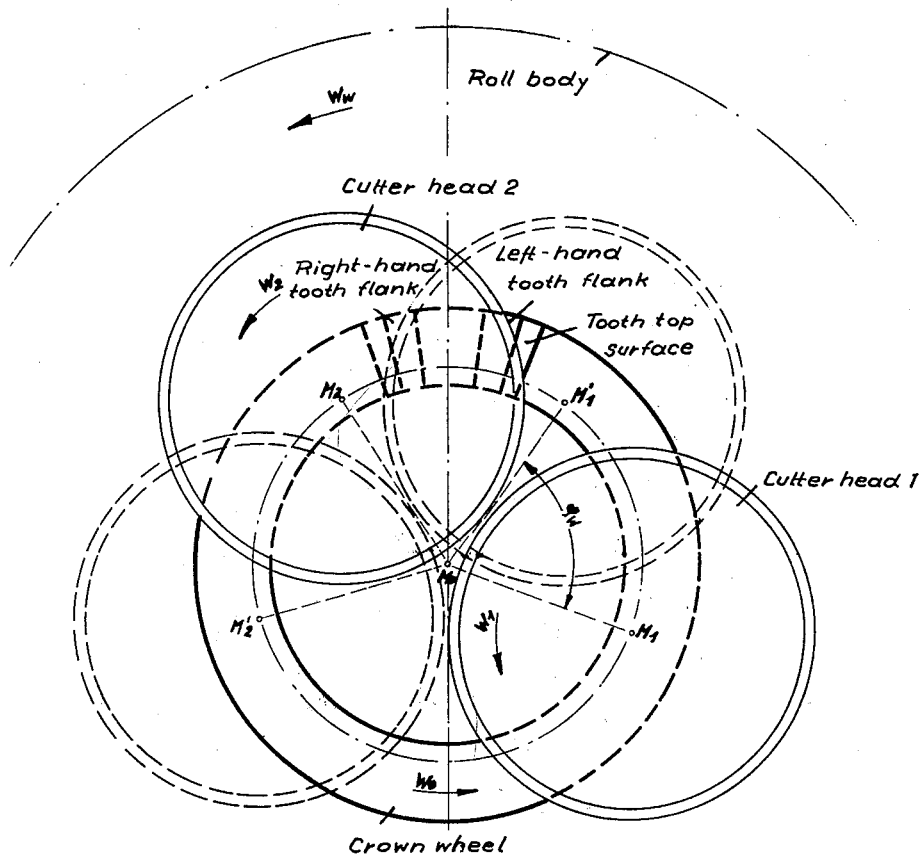
FIG. 18 shows the position of the tool heads prior to and after the rolling operation for the determination of the rolling path.

In FIGURE 18 is represented the roll body with the cutter heads secured thereto. The cutter head shown in solid line shows the position at the beginning of the rolling and the cutter head shown in broken lines, the position at the end of the rolling. The roll body with the cutter heads must turn about the centre point $M_0$ through the angle $\varphi w$. This additional movement must also be imparted to the wheel.

(3) *The working of the machine during the cutting of flank lines and the simultaneous rolling of the profiles*

The machine works as follows:

The cutter heads, which are secured on the roll body, turn continuously about their axes, so that the cutters are moved with the above described cutting velocity. At the same time the roll body with the cutter heads turns about the centre point $M_0$.

This last movement goes very slowly. Likewise also the wheel blank performs about its axis a turning movement, which is necessary to the cutting of the flank lines, and which combines with the roller movement.

Figure 19:
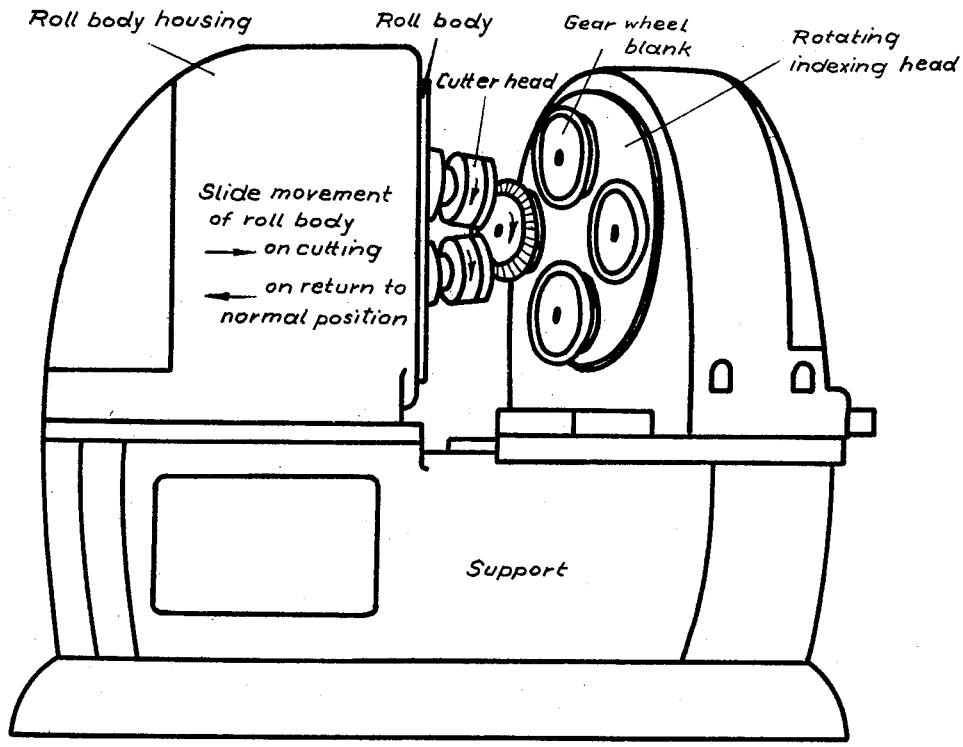
FIG. 19 shows the machine.

The roll body with the cutter heads is now moved by a feeder (FIGURE 19) on to the wheel blank. If the full tooth depth is reached then the push movement stops. There takes place now only the turning movement. If also the rolling is ended then all the teeth of the wheel are finished and the roll body with the cutter heads is drawn back to the normal position. The indexing head pivots then about its middle point and guides the next wheel blank into the operating position.

There is thus in this method no indexing and only a single rolling. The cutting process takes place continuously.

*(4) Working time with continuous cutting*

*Example.*—A wheel with 22 teeth, modulus 5, is to be cut. The tooth height is 11 mm., the feed for each wheel rotation 0.2 mm. Then for cutting the full tooth depth $$\frac{11}{0.2}=55 \text{ rotations are necessary.}$$

The cutter head has the diameter of 140 mm. and comprises two cutter series. In each rotation the machine tools must make $$\frac{22}{2}=11 \text{ rotations.}$$

If the cutter velocity necessary is 75 m./min. then the cutter head requires $$n=\frac{75}{0.14\times 3.14}=170 \text{ rotations per minute.}$$

Consequently the working time for cutting all the complete tooth depths is as follows:

The total number of turns of the cutter heads for cutting is: $55\times 11 = 600$ rotations.

The tools make 170 rotations per minute so that the working time is:

$$\frac{600}{170}=3.50 \text{ minutes}$$

If it takes 1.5 minutes for forming the profile then the total toothing time is 5 minutes for the wheel.

GRINDING THE TEETH

The bevel gears manufactured according to this process can be ground in a known grinding machine after hardening of the teeth.

SPHERE OF APPLICATION OF THE INVENTION

The continuous cutting process is just as suitable for the manufacture of small toothed members as for the mass production of wheels. The tool is only partly connected and in practice one can cut each tooth number in the same spacing. All bevel gears with linear teeth, for example differential bevel gears for vehicle construction and all wheels for machine construction, can be made thereby. The cost of the cutter heads is low.

TECHNICAL ADVANCE OVER WHAT IS PREVIOUSLY KNOWN

The technical advance of the invention consists in that the bevel gear with linear or crowned flank lines is manufactured by an accurate continuously working cutter process, which exceeds in indexing precision any roller indexing method known today and moreover affords the lowest working time.

What I claim is:

1. A method of cutting straight teeth into the blank of a bevel gear wheel, which comprises continuously rotating a plurality of tools each having spirally arranged cutting edges representing the right and left hand flanks of an imaginary gear wheel meshing with said blank, rolling circles concentric with the centers of rotation of said tools on a circle concentric with said blank, whereby the tool axes move relative to the blank on paths concentric with the blank axis, and rotating said last-mentioned circle on its own axis, whereby a longitudinally linear flank line on each workpiece tooth is the envelope for successively generated cycloidal cutting arcs.

2. The method according to claim 1 wherein the main group of cutting edges on each tool are arranged to form a spiral which is uniform with respect to the tool center of rotation, with several cutting edges displaced from said uniform relationship, whereby curved flank lines and thereby crowned tooth surfaces will be produced by said tools.

3. The method according to claim 1, wherein said tools have the same rotational direction.

4. The method according to claim 1, wherein said tools have opposed rotational directions.

5. The method according to claim 1, wherein said cutting edges work simultaneously in one or more tooth spaces.

6. The method according to claim 1, wherein said tools work in the plane of a crown wheel of the teeth.

7. The method according to claim 1, wherein said tools work in a plane other than the plane of a crown wheel of the teeth.

8. A method of cutting straight teeth into the blank of a bevel gear wheel, which comprises continuously rotating a plurality of tools each having spirally arranged cutting edges representing the right and left hand flanks of an imaginary gear wheel meshing with said blank, rolling circles concentric with the centers of rotation of said tools in a circle concentric with said blank, whereby the tool axes move relative to the blank on paths concentric with the blank axis, and rotating said last-mentioned circle on its own axis, whereby a longitudinally linear flank line on each workpiece tooth is the envelope for successively generated cycloidal cutting arcs.

9. The method according to claim 8, wherein the main group of cutting edges on each tool are arranged to form a spiral which is uniform with respect to the tool center of rotation, with several cutting edges displaced from said uniform relationship, whereby curved flank lines and thereby crowned tooth surfaces will be produced by said tools.

10. The method according to claim 8, wherein said tools have the same rotational direction.

11. The method according to claim 8, wherein said tools have opposed rotational directions.

12. The method according to claim 8, wherein said cutting edges work simultaneously in one or more tooth spaces.

13. The method according to claim 8, wherein said tools work in the plane of a crown wheel of the teeth.

14. The method according to claim 8, wherein said tools work in a plane other than the plane of a crown wheel of the teeth.

15. A method of cutting straight teeth into the blank of a bevel gear wheel, which comprises continuously rotating a plurality of tools each having a plurality of groups of spirally arranged cutting edges representing the right and left hand flanks of an imaginary gear wheel meshing with said blank, rolling circles concentric with the centers of rotation of said tools on a circle concentric with said blank, whereby the tool axes move relative to the blank on paths concentric with the blank axis, and rotating said last-mentioned circle on its own axis, whereby a longitudinally linear flank line on each workpiece tooth is the envelope for successively generated cycloidal cutting arcs.

16. A method of cutting straight teeth into the blank of a bevel gear wheel, which comprises continuously rotating a plurality of tools each having a plurality of groups of spirally arranged cutting edges representing the right and left hand flanks of an imaginary gear wheel meshing with said blank, rolling circles concentric with the centers of rotation of said tools in a circle concentric with said blank, whereby the tool axes move relative to the blank on paths concentric with the blank axis, and rotating said last-mentioned circle on its own axis, whereby a longitudinally linear flank line on each workpiece tooth is the envelope for successively generated cycloidal cutting arcs.

References Cited in the file of this patent

UNITED STATES PATENTS

| | | |
|---|---|---|
| 1,973,135 | Adams | Sept. 11, 1934 |
| 2,339,375 | Cassell | Jan. 18, 1944 |
| 2,783,686 | Ciallie et al. | Mar. 5, 1957 |
| 2,881,665 | Krumme | Apr. 14, 1959 |
| 2,932,239 | Wildhaber | Apr. 12, 1960 |

FOREIGN PATENTS

| | | |
|---|---|---|
| 983,732 | France | Feb. 14, 1951 |